US012494481B2

(12) United States Patent
He et al.

(10) Patent No.: US 12,494,481 B2
(45) Date of Patent: Dec. 9, 2025

(54) CORE-SHELL COMPOSITE NEGATIVE ELECTRODE MATERIAL, PREPARATION METHOD THEREFOR AND USE THEREOF (71) Applicants: BTR NEW MATERIAL GROUP CO., LTD., Guangdong (CN); DINGYUAN NEW ENERGY TECHNOLOGY CO., LTD., Guangdong (CN)

(72) Inventors: Peng He, Guangdong (CN); Eming Guo, Guangdong (CN); Jianguo Ren, Guangdong (CN); Xueqin He, Guangdong (CN)

(73) Assignee: BTR NEW MATERIAL GROUP CO., LTD., Guangdong (CN)

(*) Notice: Subject to any disclaimer, the term of this patent is extended or adjusted under 35 U.S.C. 154(b) by 840 days.

(21) Appl. No.: 17/286,435

(22) PCT Filed: May 15, 2020

(86) PCT No.: PCT/CN2020/090681
§ 371 (c)(1),
(2) Date: Apr. 16, 2021

(87) PCT Pub. No.: WO2020/228829
PCT Pub. Date: Nov. 19, 2020

(65) Prior Publication Data
US 2021/0391569 A1 Dec. 16, 2021

(30) Foreign Application Priority Data
May 16, 2019 (CN) .......................... 201910411238.6

(51) Int. Cl.
H01M 4/36 (2006.01)
H01M 4/02 (2006.01)
(Continued)

(52) U.S. Cl.
CPC ........... *H01M 4/366* (2013.01); *H01M 4/133* (2013.01); *H01M 4/134* (2013.01);
(Continued)

(58) Field of Classification Search
None
See application file for complete search history.

(56) References Cited

U.S. PATENT DOCUMENTS

2010/0143798 A1* 6/2010 Zhamu ................. H01M 4/133
977/734
2010/0190061 A1* 7/2010 Green .................. H01M 4/134
429/231.95
(Continued)

FOREIGN PATENT DOCUMENTS

CN 102956877 A 3/2013
CN 103199252 A 7/2013
(Continued)

OTHER PUBLICATIONS

Yu (Cn 10452698B) English translation from EPO (Year: 2015).*
(Continued)

Primary Examiner — Jonathan G Leong
Assistant Examiner — Claire A Rutiser
(74) Attorney, Agent, or Firm — Merchant & Gould P.C.

(57) ABSTRACT

A core-shell composite negative electrode material is made according to a preparation method and includes an application thereof. The composite negative electrode material includes: a core formed by a first active substance and a second active substance, and a carbon-coated shell serving as a third active substance. The first active substance is a sheet-like silicon-based material, the second active substance is a sheet-like graphite material, and the third substance is the carbon-coated shell. The composite material is applied to the negative electrode of a lithium ion battery, and
(Continued)

has high specific capacity, wherein the capacity is greater than 400 mAh/g, and excellent cycle life.

15 Claims, 2 Drawing Sheets

(51) Int. Cl.
| | |
|---|---|
| H01M 4/133 | (2010.01) |
| H01M 4/134 | (2010.01) |
| H01M 4/1393 | (2010.01) |
| H01M 4/1395 | (2010.01) |
| H01M 4/38 | (2006.01) |
| H01M 4/587 | (2010.01) |
| H01M 10/0525 | (2010.01) |

(52) U.S. Cl.
CPC ....... *H01M 4/1393* (2013.01); *H01M 4/1395* (2013.01); *H01M 4/386* (2013.01); *H01M 4/587* (2013.01); *H01M 10/0525* (2013.01); H01M 2004/021 (2013.01); H01M 2004/027 (2013.01)

(56) References Cited

U.S. PATENT DOCUMENTS

| | | | |
|---|---|---|---|
| 2012/0164531 A1* | 6/2012 | Chen | H01M 4/1393 252/502 |
| 2012/0315482 A1* | 12/2012 | Muramatsu | C04B 35/62281 977/734 |
| 2013/0045419 A1* | 2/2013 | Chun | C01B 33/146 423/325 |
| 2013/0252110 A1 | 9/2013 | Park et al. | |
| 2013/0266849 A1* | 10/2013 | Hara | H01M 4/364 429/211 |
| 2016/0190552 A1 | 6/2016 | Murata | |
| 2017/0133669 A1 | 5/2017 | Green | |
| 2018/0053936 A1* | 2/2018 | Sato | H01M 4/525 |
| 2018/0226677 A1* | 8/2018 | Nishiura | H01M 4/662 |
| 2018/0342757 A1* | 11/2018 | Choi | H01M 4/386 |
| 2019/0312264 A1* | 10/2019 | Shin | H01M 4/364 |

FOREIGN PATENT DOCUMENTS

| | | |
|---|---|---|
| CN | 103474631 A | 12/2013 |
| CN | 104103807 A | 10/2014 |
| CN | 104752698 A | 7/2015 |
| CN | 107093721 A | 8/2017 |
| CN | 108054368 A | 5/2018 |
| JP | 2017050142 A | 3/2017 |
| JP | 2018048070 A | 3/2018 |
| JP | 2018110076 A | 7/2018 |
| KR | 1020140085822 A | 7/2014 |
| KR | 1020170086870 A | 7/2017 |
| KR | 1020180056395 A | 5/2018 |
| WO | 2015114692 A1 | 8/2015 |

OTHER PUBLICATIONS

Wang. "Silicon/carbon nanocomposite pyrolyzed from phenolic resin as anode materials for lithium-ion batteries." (Year: 2013).*
International Search Report of the International Searching Authority issued in corresponding International Patent Application No. PCT/CN2020/090681, mailed Aug. 21, 2020, (with English translation, 8 pages).
European Office Action received for EP Application No. 20805864.4 on Dec. 8, 2021, 4 pgs.
International Search Report and Written Opinion received for PCT Serial No. PCT/CN2020/090681 on Aug. 21, 2020, 11 pgs.
Japanese Office Action received for JP Application No. 2021-534424 on Oct. 17, 2022, 11 pgs.
Korean Office Action received for KR Application No. 10-2021-7005502 on Feb. 8, 2023, 18 pgs.
Japanese Office Action received for JP Application No. 2021-534424 on Mar. 7, 2022, 9 pgs.
European Extended Search Report received for EP Application No. 20805864.4 on Nov. 26, 2021, 3 pgs.
Zhao, Qingmei, et al., "Effect of pyrolytic polyacrylonitrile on electrochemical performance of Si/graphite composite anode for lithium-ion batteries", Ionics, Kiel, DE, vol. 23, No. 7, Jan. 25, 2017, ISSN: 0947-7047, DOI: 10.1007/S11581-017-1992-2, 8 pgs.
Japanese Decision to Grant received for JP Application No. 2021-534424 on Apr. 21, 2023, 6 pgs.

* cited by examiner

CORE-SHELL COMPOSITE NEGATIVE ELECTRODE MATERIAL, PREPARATION METHOD THEREFOR AND USE THEREOF

This application is a National Stage Application of PCT/CN2020/090681, filed 15 May 2020, which claims benefit of Serial No. 201910411238.6, filed 16 May 2019 in China and which applications are incorporated herein by reference. To the extent appropriate, a claim of priority is made to each of the above-disclosed applications.

TECHNICAL FIELD

The present disclosure belongs to the field of lithium ion battery negative electrode material application, relates to a composite negative electrode material, a method for preparing the same and application thereof, for example, relates to a core-shell type high-capacity long-cycle composite negative electrode material for lithium ion batteries, a method for preparing the same and a lithium ion battery containing the composite material.

BACKGROUND ART

Due to a long cycling life, high specific energy and good safety performance, the lithium ion battery has been widely used, and has received close attention from all aspects. As a conventional negative electrode material of lithium ion batteries, the graphite material has stable electrochemical property, but its own specific capacity is not high, only 372 mAh/g theoretically, then it cannot meet the ever-increasing demand for high energy density lithium ion batteries in the market today. The silicon-based negative electrode material has a high theoretical specific capacity, but it has large volume expansion in the process of lithium removal/insertion, thus leading to breakage and pulverization of particles of the silicon-based material, deactivating the material, and finally causing severe degradation of the cycling performance; besides, the poor conductivity of the silicon-based material affects the rate capability of the material and the like.

A method for preparing a carbon-coated silicon/graphite composite material includes: dissolving 5-7 parts of sucrose in 60-70 parts of anhydrous ethanol, stirring and dissolving the resultant on a magnetic stirrer, and adding 20-30 parts of industrial silicon powder and stirring and dispersing, then ultrasonically dispersing for 2-3 h, subsequently placing the mixture in a high-energy ball-milling jar for ball milling at 450 r/min for 25-27 h, drying the mixture obtained from the ball milling in a vacuum drying cabinet at a constant temperature of 45-55° C. for 23-25 h, then placing the resultant in a tube furnace to be heated to 580-590° C. at a heating rate of 2° C./min under protection of an argon atmosphere to calcine for 3.5-4.5 h, after natural cooling, obtaining a carbon-coated silicon material; and adding 5-15 parts of the carbon-coated silicon material prepared above and 30-40 parts of natural graphite to 75-85 parts of ethanol, ultrasonically dispersing the resultant for 2-3 h, ball-milling the resulting mixture at 450 r/min for 25-27 h, stirring and drying the resulting mixture at 45-55° C., further drying under vacuum at 65-75° C. for 14-16 h, and cooling to obtain the final product. Each raw material is in parts by weight. Carbon-coated silicon/graphite composite material prepared with this method has good reversible specific capacity, good rate capability and cycling stability, but has limited improvement on property and can hardly meet practical application requirements.

Although the cycling, expansion and rate capability of the silicon-based materials may be improved to some extent by means of silicon-based material nanocrystallization, graphite compounding, carbon coating and the like, the disadvantages of the silicon-based material are still obvious, and the application is limited.

SUMMARY

The following is a summary of the subject matter described in detail herein. The present summary is not intended to limit the scope of protection of the claims.

The present disclosure aims at providing a composite negative electrode material, a method for preparing the same and application (use) thereof, and particularly relates to a core-shell type high-capacity long-cycle composite negative electrode material for lithium ion batteries, a method for preparing the same and a lithium ion battery containing the composite material.

In order to achieve the above objective, the present disclosure adopts a technical solution as follows.

In a first aspect, the present disclosure provides a core-shell type composite negative electrode material, wherein the core-shell type composite negative electrode material includes: an inner core formed of a first active substance and a second active substance, and a carbon coating outer shell acting as a third active substance, the first active substance is a sheet-like silicon-based material, and the second active substance is a sheet-like graphite material.

In the core-shell type composite negative electrode material provided in the present disclosure, the sheet-like silicon-based material and the sheet-like graphite material form the inner core. As the sheet-like silicon-based material particles have a large specific surface area and irregular morphology, the inter-particle bonding force and bonding tightness of the silicon-based material may be effectively improved, and the compounding effect between the sheet-like silicon-based material and the sheet-like graphite material may be improved; and the bonding property between the sheet-like silicon-based material and the sheet-like graphite material is good, the sheet-like silicon-based material may be dispersed between a plurality of sheet layers of graphite, and the sheet-like graphite material forms a good conductive network among the particles, thereby improving the conductivity inside the material and buffering the expansion of the nano-silicon-based material, and coating a dense conductive carbon layer outside the inner core formed by the sheet-like silicon-based material and the sheet-like graphite material, which may improve the conductivity of the material, further reduce voids inside and outside the particles, and effectively suppress the material expansion and reduce the side reaction between the material and the electrolyte.

As an optional technical solution of the core-shell type composite negative electrode material of the present disclosure, an aspect ratio of the sheet-like silicon-based material is 1.5~100, excluding 1.5, for example, 1.6, 1.8, 2, 2.5, 2.8, 3, 3.5, 4, 5, 5.5, 6, 8, 10, 15, 20, 23, 26, 30, 35, 40, 45, 50, 60, 65, 70, 80, 85, 90 or 100. The aspect ratio of the particles is a ratio of maximum linearity to minimum linearity of the particles. In this optional technical solution, by defining the aspect ratio of the sheet-like silicon-based material, the bonding property between the sheet-like silicon-based material and the sheet-like graphite material may be elevated, a network structure formed by the two may be improved, and the electrochemical property may be better promoted.

Optionally, the aspect ratio of particles of the sheet-like silicon-based material is 2~40.

Optionally, an aspect ratio of particles of the sheet-like graphite material is larger than 2, and less than or equal to 120, for example, 2.2, 2.5, 3, 3.5, 4, 4.2, 4.6, 5, 5.5, 6, 6.5, 7, 8, 10, 15, 20, 25, 28, 32, 36, 40, 45, 50, 60, 70, 80, 85, 90, 100, 105, 110 or 120. The aspect ratio of particles is a ratio of maximum linearity to minimum linearity of the particles. In this optional technical solution, by defining the type and aspect ratio of the sheet-like graphite material, the bonding property between the sheet-like graphite material and the sheet-like silicon-based material may be elevated, a network structure formed by the two may be improved, and the electrochemical property may be better promoted.

Optionally, the aspect ratio of the sheet-like graphite material is 3~50.

In the present disclosure, the aspect ratio of the sheet-like material (such as the sheet-like silicon-based material and the sheet-like graphite material) is a ratio of maximum linearity to minimum linearity of particles, wherein the maximum linearity of the sheet-like material is maximum length of a two-dimensional plane of the sheet-like material, and the minimum linearity is thickness of the sheet-like material.

The sheet-like material and the aspect ratio in the present disclosure have the following relationships: for the silicon-based material, if the aspect ratio is less than 1.5, it is a non-sheet-like silicon-based material; and for the graphite material, if the aspect ratio is less than 2, it is non-sheet-like graphite.

Optionally, the carbon coating is converted from an organic carbon source by sintering. For example, an organic carbon source such as polyesters, saccharides, organic acids or asphalt is used, and the organic carbon source is converted into the carbon coating by sintering under an inert atmosphere at 500° C.~1200° C.

Optionally, the carbon coating has a thickness of 0.05~3 μm, for example, 0.05 μm, 0.1 μm, 0.2 μm, 0.5 μm, 1 μm, 1.2 μm, 1.5 μm, 1.8 μm, 2 μm, 2.4 μm, 2.7 μm or 3 μm.

As an optional technical solution of the method of the present disclosure, the composition of the first active substance includes a combination of at least two of Si, $SiO_x$ or Si-M alloy, for example, may be a combination of Si and $SiO_x$, a combination of Si and Si-M alloy, a combination of $SiO_x$ and Si-M alloy, and a combination of Si, $SiO_x$ and Si-M alloy, where $0.5 \leq x \leq 1.5$, for example, 0.5, 0.7, 0.8, 1, 1.2, 1.3 or 1.5; and M is any one or a combination of at least two of B, Fe, Cu, Sn, Ge, Ti, Mg, Ni or Ce.

Optionally, in the first active substance, an absolute value of difference between median particle sizes of different kinds of substances is 50 nm~1500 nm, for example, 50 nm, 100 nm, 125 nm, 200 nm, 300 nm, 400 nm, 500 nm, 600 nm, 700 nm, 800 nm, 900 nm, 1000 nm, 1100 nm, 1200 nm, 1300 nm, 1400 nm or 1500 nm. Using the large and small particles in cooperation according to this optional solution may improve the dispersibility of the nano-silicon-based material, and reduce the agglomeration between the particles.

Optionally, the first active substance consists of Si and $SiO_x$ in a mass ratio of 0.01~100, the median particle size of Si is 10~300 nm, the median particle size of $SiO_x$ is 150~5000 nm, and the median particle size of Si is smaller than that of $SiO_x$. The mass ratio is, for example, 0.01, 0.05, 0.1, 0.2, 1, 2, 5, 10, 15, 20, 35, 50, 60, 65, 70, 80, 85, 95 or 100; the median particle size of the Si is, for example, 10 nm, 30 nm, 50 nm, 100 nm, 150 nm, 170 nm, 185 nm, 200 nm, 220 nm, 240 nm, 280 nm or 300 nm; and the median particle size of the $SiO_x$ is, for example, 150 nm, 200 nm, 300 nm, 400 nm, 450 nm, 500 nm, 600 nm, 800 nm, 1000 nm, 1250 nm, 1500 nm, 2000 nm, 2500 nm, 3000 nm, 3500 nm, 3800 nm, 4000 nm, 4500 nm or 5000 nm. In this preferable technical solution, Si with a median particle size of 10~300 nm is used, and at this particle size, the material has the minimum expansion (when the median particle size of the Si particles is greater than 300 nm, the expansion increases rapidly), and the cycling stability is optimal, moreover, $SiO_x$ with small expansion and median particle size of 150~5000 nm is used in cooperation. Simultaneously using the large and small particles in cooperation improves the dispersibility of the nano-silicon-based material, reduces agglomeration between the particles, and thus renders the optimal complementary effect and optimal performance.

Optionally, the first active substance consists of Si and Si-M alloy in a mass ratio of 0.01~100, the median particle size of Si is 10~300 nm, the median particle size of Si-M alloy is 150~5000 nm, and the median particle size of Si is smaller than that of Si-M alloy. The mass ratio is, for example, 0.01, 0.05, 0.1, 0.2, 1, 2, 5, 10, 15, 20, 35, 50, 60, 65, 70, 80, 85, 95 or 100; the median particle size of the Si is, for example, 10 nm, 30 nm, 50 nm, 100 nm, 150 nm, 170 nm, 185 nm, 200 nm, 220 nm, 240 nm, 280 nm or 300 nm; and the median particle size of the Si-M alloy is, for example, 150 nm, 200 nm, 300 nm, 400 nm, 450 nm, 500 nm, 600 nm, 800 nm, 1000 nm, 1250 nm, 1500 nm, 2000 nm, 2500 nm, 3000 nm, 3500 nm, 3800 nm, 4000 nm, 4500 nm or 5000 nm. In this preferable technical solution, Si with a median particle size of 10~300 nm is used, and at this particle size, the material has the minimum expansion, and the cycling stability is optimal, moreover, Si-M alloy with small expansion and median particle size of 150~5000 nm is used in cooperation. Simultaneously using the large and small particles in cooperation improves the dispersibility of the nano-silicon-based material, reduces agglomeration between the particles, and thus renders the optimal complementary effect and optimal performance.

Optionally, the first active substance consists of $SiO_x$ and Si-M alloy in a mass ratio of 0.01~100, the median particle size of the $SiO_x$ is 150~400 nm (for example, 150 nm, 170 nm, 185 nm, 200 nm, 220 nm, 240 nm, 280 nm, 300 nm, 350 nm or 400 nm), the median particle size of the Si-M alloy is 200~5000 nm (for example, 200 nm, 250 nm, 400 nm, 600 nm, 800 nm, 1000 nm, 1250 nm, 1500 nm, 2000 nm, 2500 nm, 3000 nm, 3500 nm, 3800 nm, 4000 nm, 4500 nm or 5000 nm), and the median particle size of the $SiO_x$ is smaller than that of the Si-M alloy. In this preferable technical solution, $SiO_x$ with a median particle size of 150~400 nm is used in cooperation with the Si-M alloy with less expansion and the median particle size of 400~5000 nm. Simultaneously using the large and small particles in cooperation improves the dispersibility of the nano-silicon-based material, reduces agglomeration between particles, and thus renders the optimal complementary effect and optimal performance.

Optionally, the first active substance consists of $SiO_x$ and Si-M alloy in a mass ratio of 0.01~100, the median particle size of the Si-M alloy is 150~400 nm (for example, 150 nm, 170 nm, 185 nm, 200 nm, 220 nm, 240 nm, 280 nm, 300 nm, 350 nm or 400 nm), the median particle size of the $SiO_x$ is 200~5000 nm (for example, 200 nm, 250 nm, 400 nm, 600 nm, 800 nm, 1000 nm, 1250 nm, 1500 nm, 2000 nm, 2500 nm, 3000 nm, 3500 nm, 3800 nm, 4000 nm, 4500 nm or 5000 nm), and the median particle size of the Si-M alloy is smaller than that of the $SiO_x$. The Si-M alloy with a median particle size of 150~400 nm is used in cooperation with the $SiO_x$ with less expansion and the median particle size of 400~5000 nm. Simultaneously using the large and small particles in cooperation improves the dispersibility of the nano-silicon-based material, reduces agglomeration between particles, and thus renders the better complementary effect and better performance.

Optionally, the component of the second active substance includes any one or a combination of two of natural graphite or artificial graphite.

Optionally, the median particle size of the second active substance is 1~15 μm, for example, 1 μm, 2 μm, 3 μm, 4.5 μm, 5 μm, 6 μm, 8 μm, 10 μm, 12 μm, 13 μm, or 15 μm.

Optionally, the median particle size of the second active substance is greater than that of the first active substance, with the difference of 2 μm~12 μm, and in this optional range, the dispersibility and bonding property of the sheet-like silicon-based material between the graphite sheet layers may be better improved, and the electrochemical property may be advantageously elevated.

Optionally, based on the total mass of the core-shell type composite negative electrode material being 100 wt %, the mass percentage content of the first active substance is 1~70 wt %, for example, 1 wt %, 3 wt %, 5 wt %, 8 wt %, 10 wt %, 15 wt %, 20 wt %, 25 wt %, 30 wt %, 35 wt %, 37 wt %, 40 wt %, 45 wt %, 50 wt %, 55 wt %, 60 wt %, 65 wt % or 70 wt %; the mass percentage content of the second active substance is 5~60 wt %, for example, 5 wt %, 10 wt %, 12 wt %, 18 wt %, 20 wt %, 25 wt %, 30 wt %, 35 wt %, 37 wt %, 40 wt %, 45 wt %, 50 wt %, 55 wt % or 60 wt %; and the mass percentage content of the third active substance material is 5~50 wt %, for example, 5 wt %, 10 wt %, 15 wt %, 20 wt %, 25 wt %, 30 wt %, 35 wt %, 37 wt %, 40 wt %, 45 wt % or 50 wt %.

Figure 4:
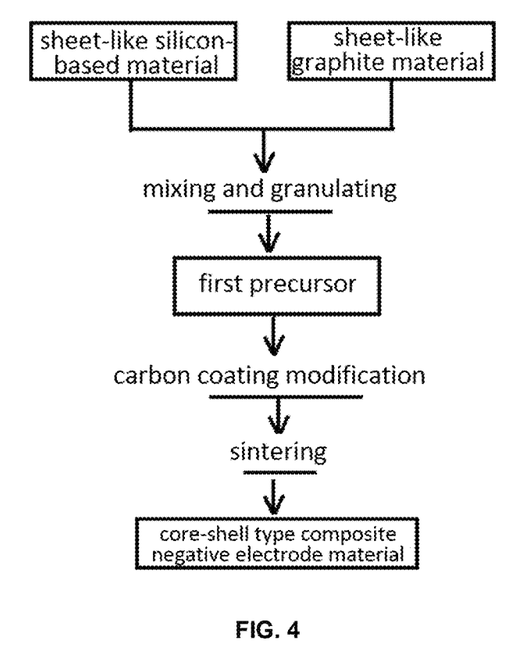
FIG. 4 is a schematic flow chart of the method for preparing the core-shell type composite negative electrode material provided by the present disclosure.

In a second aspect, the present disclosure provides a method for preparing the core-shell type composite negative electrode material according to the first aspect, wherein as shown in FIG. 4, the method includes steps of:

(1) mixing and granulating a first active substance and a second active substance to obtain a first precursor; and (2) performing carbon coating modification on the first precursor, and then sintering the modified first precursor to obtain a core-shell type composite negative electrode material.

In the above, the first active substance is a sheet-like silicon-based material, and the second active substance is a sheet-like graphite material.

As an optional technical solution of the method of the present disclosure, an aspect ratio of particles of the sheet-like silicon-based material is 1.5~100, excluding 1.5, and the aspect ratio of the particles is a ratio of maximum linearity to minimum linearity of the particles.

Optionally, the specific surface area of the sheet-like silicon-based material is 50~500 m$^2$/g, for example, 50 m$^2$/g, 65 m$^2$/g, 80 m$^2$/g, 100 m$^2$/g, 125 m$^2$/g, 150 m$^2$/g, 200 m$^2$/g, 240 m$^2$/g, 270 m$^2$/g, 300 m$^2$/g, 350 m$^2$/g, 400 m$^2$/g, 450 m$^2$/g or 500 m$^2$/g.

Optionally, the aspect ratio of the sheet-like graphite material is larger than 2 and less than or equal to 120.

Optionally, the composition of the first active substance includes a combination of at least two of Si, SiO$_x$ or Si-M alloy, where $0.5 \leq x \leq 1.5$, and M is any one or a combination of at least two of B, Fe, Cu, Sn, Ge, Ti, Mg, Ni or Ce.

Optionally, in the first active substance, an absolute value of difference between the median particle sizes of different kinds of substances is 50 nm~1500 nm.

Optionally, the first active substance consists of Si and SiO$_x$ in a mass ratio of 0.01~100, the median particle size of Si is 10~300 nm, the median particle size of SiO$_x$ is 150~5000 nm, and the median particle size of Si is smaller than that of SiO$_x$.

Optionally, the first active substance consists of Si and Si-M alloy in a mass ratio of 0.01~100, the median particle size of Si is 10~300 nm, the median particle size of Si-M alloy is 150~5000 nm, and the median particle size of Si is smaller than that of Si-M alloy.

Optionally, the first active substance consists of SiO$_x$ and Si-M alloy in a mass ratio of 0.01~100, the median particle size of SiO$_x$ is 150~400 nm, the median particle size of Si-M alloy is 200~5000 nm, and the median particle size of SiO$_x$ is smaller than that of Si-M alloy.

Optionally, the first active substance consists of SiO$_x$ and Si-M alloy in a mass ratio of 0.01~100, the median particle size of Si-M alloy is 150~400 nm, the median particle size of SiO$_x$ is 200~5000 nm, and the median particle size of Si-M alloy is smaller than that of SiO$_x$.

Optionally, the first active substance consists of Si, SiO$_x$ and Si-M alloy, the mass ratio of Si to SiO$_x$ is 0.02~100, the mass ratio of Si to Si-M alloy is 0.02~100, the median particle size of Si is 10~300 nm, the median particle size of SiO$_x$ is 150~5000 nm, the median particle size of Si-M alloy is 150~5000 nm, and the median particle size of Si<the median particle size of SiO$_x$<the median particle size of Si-M alloy;

Optionally, the first active substance consists of Si, SiO$_x$ and Si-M alloy, the mass ratio of Si to SiO$_x$ is 0.02~100, the mass ratio of Si to Si-M alloy is 0.02~100, the median particle size of Si is 10~300 nm, the median particle size of SiO$_x$ is 150~5000 nm, the median particle size of Si-M alloy is 150~5000 nm, and the median particle size of Si<the median particle size of Si-M alloy<the median particle size of SiO$_x$.

Optionally, the component of the second active substance includes any one or a combination of two of natural graphite or artificial graphite.

Optionally, the median particle size of the second active substance is 1~15 μm.

As an optional technical solution of the method of the present disclosure, a method for the mixing and granulating in step (1) is any one of spray drying, mixing heating or kneading molding.

Optionally, a method for the carbon coating modification in step (2) is any one of a liquid phase coating method, a solid phase coating method or a gas phase coating method.

Optionally, a process step of the liquid phase coating method includes dispersing a first precursor and a carbon source in an organic solvent system, and drying the resultant to obtain a second precursor.

Optionally, a process step of the solid phase coating method includes mixing the first precursor and the carbon source into a mixer to obtain the second precursor.

Optionally, in the liquid phase coating method and the solid phase coating method, the carbon source is independently any one or a combination of at least two of polyesters, saccharides, organic acids or asphalt.

Optionally, the polyesters include any one or a combination of at least two of phenolic resin, polyethylene terephthalate, polybutylene terephthalate or polyarylate, and typical but non-limiting examples of the combination include a combination of phenolic resin and polyethylene terephthalate, a combination of polyethylene terephthalate and polyarylate, a combination of phenolic resin, polybutylene terephthalate and polyarylate, and so on.

Optionally, a process step of the gas phase coating method includes: taking an organic carbon source gas as a coating source in a reaction furnace, heating to 500° C.~1200° C. under the condition of introducing an inert gas, and carrying out carbon coating on the first precursor to obtain the second precursor.

In the gas phase coating method, the temperature is raised to, for example, 500° C., 600° C., 650° C., 700° C., 750° C., 800° C., 900° C., 1000° C., 1100° C. or 1200° C.

Optionally, in the gas phase coating method, the organic carbon source gas is any one or a combination of at least two of hydrocarbons or aromatic hydrocarbon derivatives with 1~3 benzene rings.

In step (3) of the present disclosure, the sintering is high-temperature sintering.

Optionally, the sintering in step (3) includes: placing the second precursor into a reactor, heating to 500° C.~1200° C. under the condition of introducing an inert gas for protection, to obtain the core-shell type composite negative electrode material.

In the sintering in step (3), the temperature is raised to, for example, 500° C., 600° C., 650° C., 700° C., 750° C., 800° C., 900° C., 1000° C., 1100° C. or 1200° C.

Optionally, the reactor includes any one of a vacuum furnace, a box furnace, a rotary furnace, a roller kiln, a pusher kiln or a tube furnace.

In a third aspect, the present disclosure provides a negative electrode, wherein the negative electrode contains the core-shell type negative electrode material according to the first aspect.

In a fourth aspect, the present disclosure provides a lithium ion battery, wherein the lithium ion battery contains the core-shell type composite negative electrode material according to the first aspect.

It should be noted that in the present disclosure, the aspect ratio of particles is the characteristic of single particle, and it is a different concept from the median particle size. The median particle size is statistical analysis of size distribution of the whole particles, the median particle size of the particles with different aspect ratios can be measured by a particle size analyzer. The median particle size is measured by a Malvern particle size analyzer in the present disclosure.

Compared with the prior art, the present disclosure has following beneficial effects.

(1) In the core-shell type composite negative electrode material provided in the present disclosure, as the sheet-like silicon-based material particles have a large specific surface area and irregular morphology, the inter-particle bonding force and bonding tightness of the silicon-based material may be effectively improved, and the compounding effect between the sheet-like silicon-based material and the sheet-like graphite material may be improved; and the bonding property between the sheet-like silicon-based material and the sheet-like graphite material is good, the sheet-like silicon-based material may be dispersed between a plurality of sheet layers of graphite, and the sheet-like graphite material forms a good conductive network among the particles, thereby improving the conductivity inside the material and buffering the expansion of the nano-silicon-based material, and coating a dense conductive carbon layer outside the inner core formed by the sheet-like silicon-based material and the sheet-like graphite material, which may improve the conductivity of the material, further reduce voids inside and outside the particles, and effectively suppress the material expansion and reduce the side reaction between the material and the electrolyte.

(2) In the present disclosure, by optimizing the parameters such as aspect ratio of the sheet-like silicon-based material and the sheet-like graphite material, their bonding force, bonding tightness, conductivity of the formed network structure and expansion inhibition may be improved, so that the core-shell type composite negative electrode material obtains excellent reversible capacity, first efficiency and cycling stability.

(3) In the present disclosure, by optimizing the type of the sheet-like silicon-based material, in combination with the particle size regulation and type selection, the complementary effect of advantages between materials is better exerted, and the electrochemical property of the material is improved.

(4) The core-shell type composite negative electrode material in the present disclosure is used for negative electrodes of lithium ion batteries, and has high specific capacity (capacity>400 mAh/g), high first efficiency and excellent cycling life. The present disclosure is simple in process, and is easy for large-scale production.

After reading and understanding the detailed description and accompanying drawings, other aspects may be understood.

DETAILED DESCRIPTION OF EMBODIMENTS

The technical solutions of the present disclosure are further described below in connection with accompanying drawings and specific examples.

The negative electrode materials in various examples and comparative examples were tested by a method as follows:
(1) testing the structure of the material using an X-ray diffractometer X'Pert Pro, PANalytical;
(2) testing the first charging/discharging performance by a method as follows:
dispersing the negative electrode materials of various examples and comparative examples, acetylene black, CMC, and SBR in pure water according to a mass ratio of 90:5:2.5:2.5 to mix, coating a resulting mixed slurry on a copper foil current collector, followed by vacuum drying to obtain a negative electrode plate; then assembling 1 mol/L LiPF$_6$/EC+DMC+EMC (v/v=1:1:1) electrolyte, an SK (12 μm) separator, and an outer shell into a CR2016 button battery using a conventional process, and testing the electrochemical property at 0.1 C current density; and
(3) testing the cycling performance by a method as follows:
dispersing the negative electrode material, acetylene black, CMC, and SBR in pure water according to a mass ratio of 95:2:1.5:1.5 to mix, coating the resultant on a copper foil current collector, followed by vacuum drying to obtain a negative electrode plate; then assembling a ternary positive electrode plate (NCM811) prepared by a conventional mature process, 1 mol/L LiPF$_6$/EC+DMC+EMC (v/v=1:1:1) electrolyte, an SK (12 μm) separator, and an outer shell into a 18650 cylindrical unit cell using a conventional producing process. The charging and discharging test of the cylindrical battery was carried out on a LAND battery test system of Wuhan Jinnuo Electronics Co., Ltd. under a normal temperature condition at a constant current and 1 C multiplying power, the charging and discharging voltage was controlled to be 2.75-4.2 V. The test results are shown in Table 1.

Example 1

The present example provides a core-shell type composite negative electrode material and a method for preparing the same, wherein the method includes steps of:
(1) kneading molding sheet-like silicon having a median particle size of 80 nm and an aspect ratio of 8, sheet-like $SiO_{0.96}$ having a median particle size of 400 nm and an aspect ratio of 3 and sheet-like natural graphite having a median particle size of 5 μm and an aspect ratio of 10 according to a mass ratio of 30:30:40 to obtain a precursor A;
(2) dispersing the precursor A and glucose in ethanol according to a mass ratio of 70:30, and drying the resultant to obtain a precursor B; and
(3) placing the precursor B in a box furnace, introducing nitrogen gas, and raising the temperature to 800° C. to obtain a core-shell type composite negative electrode material having a carbon coating with a thickness of 0.5 μm.

The core-shell type composite negative electrode material obtained in the present example included: an inner core formed of a first active substance and a second active substance, and a carbon coating outer shell, wherein the first active substance was a silicon-based material, specifically sheet-like silicon and sheet-like $SiO_{0.98}$, the second active substance was a sheet-like natural graphite, and the third active substance is a dense carbon coating outer shell obtained by conversion of glucose.

Figure 1:
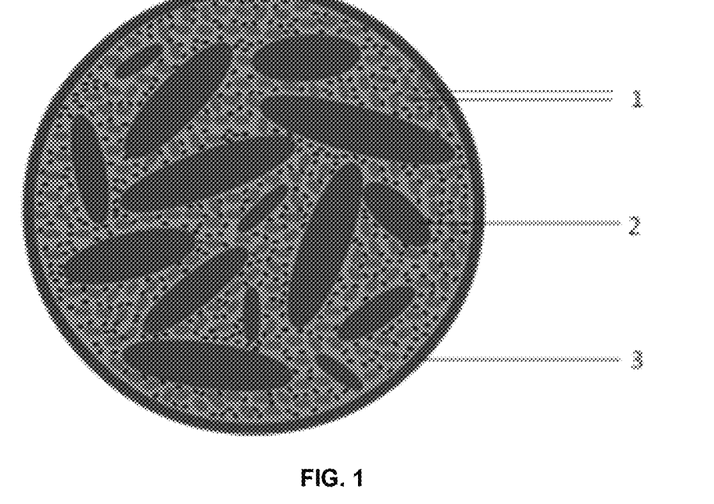
FIG. 1 is a structural schematic view of a composite negative electrode material provided in the present disclosure, wherein 1-first active substance, 2-second active substance, and 3-third active substance.
Figure 2:
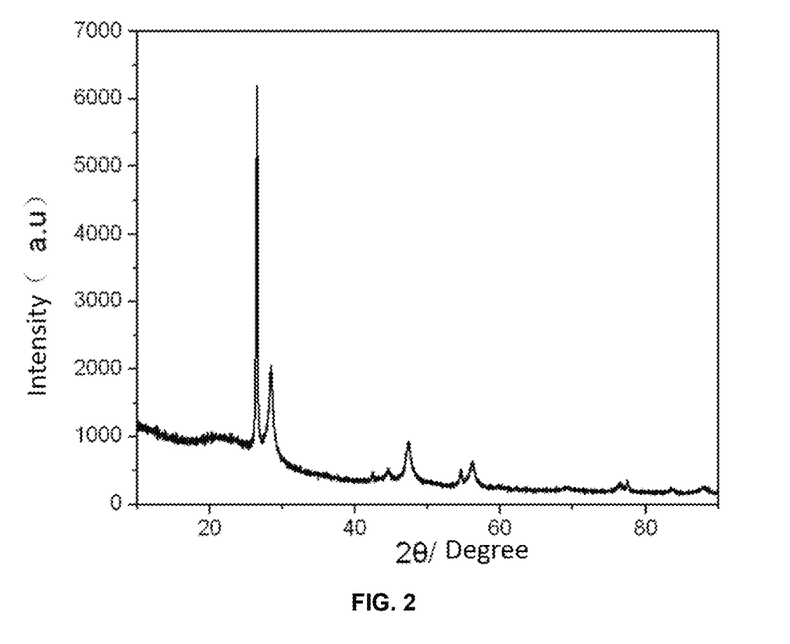
FIG. 2 shows results of the negative electrode material of Example 1 measured by X-ray diffractometer.

FIG. 2 shows results of the negative electrode material of Example 1 measured by an X-ray diffractometer. The characteristic peaks of silicon, silicon protoxide and graphite can be seen from the figure.

Figure 3:
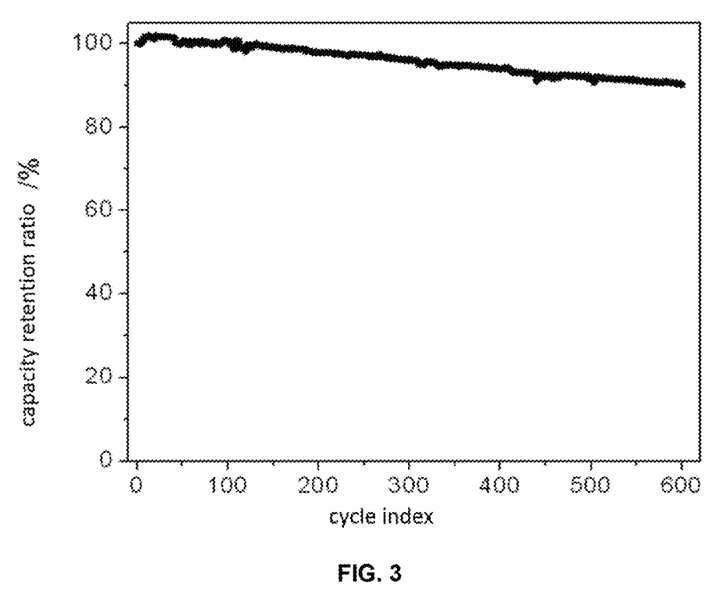
FIG. 3 shows a cyclic curve obtained by testing a battery made of the negative electrode material of Example 1.

FIG. 3 shows a cyclic curve obtained by testing a battery made of the negative electrode material of Example 1. It can be seen from the figure that the material has excellent cycling performance, and the 600-cycle capacity retention ratio is 90.2%.

Example 2

The present example provides a core-shell type composite negative electrode material and a method for preparing the same, wherein the method includes steps of:
(1) mixing and heating sheet-like silicon having a median particle size of 200 nm and an aspect ratio of 25, sheet-like Si—Fe alloy having a median particle size of 900 nm and an aspect ratio of 7.0 and sheet-like artificial graphite having a median particle size of 8 μm and an aspect ratio of 3 according to a mass ratio of 45:5:50 to obtain a precursor A;
(2) mixing the precursor A and asphalt in a mixer according to a mass ratio of 80:20 to obtain a precursor B; and
(3) placing the precursor B in a tube furnace, introducing argon gas, and raising the temperature to 900° C. to obtain a core-shell type composite negative electrode material having a carbon coating with a thickness of 0.3 μm.

Example 3

The present example provides a core-shell type composite negative electrode material and a method for preparing the same, wherein the method includes steps of:
(1) spray-drying sheet-like $SiO_{1.05}$ having a median particle size of 200 nm and an aspect ratio of 4, sheet-like Si—Cu alloy having a median particle size of 600 nm and an aspect ratio of 10 and sheet-like natural graphite having a median particle size of 10 μm and an aspect ratio of 21 according to a mass ratio of 30:35:35 to obtain a precursor A;
(2) placing the precursor A in a rotary furnace, introducing acetylene gas, and depositing the resultant at 800° C. for 2 h to obtain the precursor B; and
(3) placing the precursor B in a roller kiln, introducing nitrogen gas, and raising the temperature to 700° C. to obtain a core-shell type composite negative electrode material having a carbon coating with a thickness of 0.1 μm.

Example 4

The present example provides a core-shell type composite negative electrode material and a method for preparing the same, wherein the method includes steps of:
(1) kneading molding sheet-like Si—Ni alloy having a median particle size of 250 nm and an aspect ratio of 12, sheet-like $SiO_{1.0}$ having a median particle size of 300 nm and an aspect ratio of 6 and sheet-like artificial graphite having a median particle size of 3 μm and an aspect ratio of 15 according to a mass ratio of 35:15:60 to obtain a precursor A;
(2) mixing the precursor A and phenolic resin in a mixer according to a mass ratio of 85:15 to obtain a precursor B; and
(3) placing the precursor B in a vacuum furnace, introducing nitrogen gas, and raising the temperature to 980° C. to obtain a core-shell type composite negative electrode material having a carbon coating with a thickness of 0.3 μm.

Example 5

The present example provides a core-shell type composite negative electrode material and a method for preparing the same, wherein the method includes steps of:
(1) spray-drying sheet-like silicon having a median particle size of 200 nm and an aspect ratio of 8, sheet-like $SiO_{1.25}$ having a median particle size of 3 μm and an aspect ratio of 5 and sheet-like artificial graphite having a median particle size of 10 μm and an aspect ratio of 5 according to a mass ratio of 15:25:60 to obtain a precursor A;
(2) dispersing the precursor A and sucrose in ethanol according to a mass ratio of 80:20, and drying the resultant to obtain a precursor B; and
(3) placing the precursor B in a tube furnace, introducing nitrogen gas, and raising the temperature to 1000° C. to obtain a core-shell type composite negative electrode material having a carbon coating with a thickness of 0.4 μm.

Example 6

The present example provides a core-shell type composite negative electrode material and a method for preparing the same, wherein the method includes steps of:
(1) spray-drying sheet-like silicon having a median particle size of 50 nm and an aspect ratio of 35, sheet-like $SiO_{0.9}$ having a median particle size of 400 nm and an aspect ratio of 6, sheet-like Si—Ti alloy having a median particle size of 700 nm and an aspect ratio of 18 and sheet-like natural graphite having a median particle size of 8 μm and an aspect ratio of 40 according to a mass ratio of 25:10:15:50 to obtain a precursor A;
(2) mixing the precursor A and asphalt in a mixer according to a mass ratio of 65:35 to obtain a precursor B; and
(3) placing the precursor B in a roller kiln, introducing nitrogen gas, and raising the temperature to 650° C. to obtain a core-shell type composite negative electrode material having a carbon coating with a thickness of 0.8 μm.

Example 7

The present example provides a core-shell type composite negative electrode material and a method for preparing the same, wherein the method includes steps of:
(1) spray-drying sheet-like silicon having a median particle size of 150 nm and an aspect ratio of 15, sheet-like Si—Fe alloy having a median particle size of 300 nm and an aspect ratio of 12, sheet-like $SiO_{0.85}$ having a median particle size of 800 nm and an aspect ratio of 20 and sheet-like artificial graphite having a median particle size of 5 μm and an aspect ratio of 10 according to a mass ratio of 15:35:15:45 to obtain a precursor A;
(2) dispersing the precursor A and sucrose in ethanol according to a mass ratio 85:15, and drying the resultant to obtain a precursor B; and
(3) placing the precursor B in a tube furnace, introducing nitrogen gas, and raising the temperature to 850° C. to obtain a core-shell type composite negative electrode material having a carbon coating with a thickness of 0.3 μm.

Example 8

The present example provides a core-shell type composite negative electrode material and a method for preparing the same, and is different from Example 1 in that:
the sheet-like natural graphite having a median particle size of 5 μm and an aspect ratio of 10 was replaced with the sheet-like natural graphite having a median particle size of 1.5 μm and an aspect ratio of 10, and the remainder was the same as that of Example 1.

Example 9

The present example provides a core-shell type composite negative electrode material and a method for preparing the same, and is different from Example 1 in that:
the sheet-like natural graphite having a median particle size of 5 μm and an aspect ratio of 10 was replaced with the sheet-like natural graphite having a median particle size of 14 μm and an aspect ratio of 10, and the remainder was the same as that of Example 1.

Example 10

A high-capacity composite negative electrode material was prepared according to substantially the same method as that of Example 1, and the difference from Example 1 lies in that nano-silicon and $SiO_{0.98}$ each had a median particle size of 400 nm; and a battery was fabricated according to the same method as that of Example 1.

Example 11

A high-capacity composite negative electrode material was prepared according to substantially the same method as that of Example 1, and the difference from Example 1 lies in that the silicon-based material was sheet-like silicon having a median particle size of 80 and an aspect ratio of 8; and a battery was fabricated according to the same method as that of Example 1.

Comparative Example 1

A high-capacity composite negative electrode material was prepared according to substantially the same method as that of Example 1, and the difference from Example 1 lies in that the silicon-based material was non-sheet-like nano-silicon and non-sheet-like $SiO_{0.98}$, the nano-silicon and $SiO_{0.98}$ each had an aspect ratio of 1.1; and a battery was fabricated according to the same method as that of Example 1.

Comparative Example 2

A high-capacity composite negative electrode material was prepared according to substantially the same method as that of Example 1, and the difference from Example 1 lies in that non-sheet-like graphite having an aspect ratio of 1.2 was selected as the natural graphite; and a battery was fabricated according to the same method as that of Example 1.

TABLE 1

| Name | 0.1 C First Reversible Capacity(mAh/g) | 0.1 C First Coulombic Efficiency (%) | 1 C 600-cycle Capacity Retention Ratio (%) |
|---|---|---|---|
| Example 1 | 1137.4 | 88.0 | 90.2 |
| Example 2 | 1732.2 | 89.2 | 89.0 |
| Example 3 | 890.7 | 87.2 | 90.1 |
| Example 4 | 717.5 | 87.5 | 89.7 |
| Example 5 | 1008.3 | 87.8 | 89.6 |
| Example 6 | 1056.8 | 88.1 | 89.8 |
| Example 7 | 985.7 | 87.6 | 89.5 |
| Example 8 | 1056.8 | 87.5 | 85.9 |
| Example 9 | 1121.2 | 87.8 | 86.5 |
| Example 10 | 1059.0 | 87.8 | 81.9 |
| Example 11 | 1324.4 | 88.1 | 80.2 |
| Comparative Example 1 | 1085.3 | 86.5 | 74.3 |
| Comparative Example 2 | 1124.6 | 87.0 | 77.1 |

The negative electrode material in each example of the present disclosure has high specific capacity, high efficiency and excellent cycling life.

From comparison between Example 1 and Example 8, it can be seen that in Example 8, the difference between median particle sizes of the graphite and the silicon-based material is smaller than 2 μm, the dispersing effect of the silicon-based material and the graphite material becomes poor, the agglomeration of the silicon-based particles is increased, the buffering effect of the graphite is weakened, and the cycling performance is deteriorated.

From comparison between Example 1 and Example 9, it can be seen that in Example 9, the difference between median particle sizes of the graphite and the silicon-based material is greater than 12 μm, the granulation effect of the particles becomes poor, the dispersing effect of the silicon-based material and the graphite material becomes poor, the agglomeration of the silicon-based particles is increased, the graphite conductive network among the particles is weakened, and the cycling performance is deteriorated.

From comparison between Example 1 and Example 10, it can be seen that in Example 10, silicon greater than 300 nm is used, the material expands greatly, moreover, the median particle sizes of Si and $SiO_{0.98}$ are the same, the agglomeration is relatively severe, which results in poor dispersing effect of the particles, increased local expansion, and finally sharp degradation of the cycling performance.

From comparison between Example 1 and Example 11, it can be seen that in Example 11, only silicon is used, although the capacity efficiency is increased, the material expands greatly, the agglomeration is severe, the dispersing effect of the particles is poor, and finally the cycling performance is sharply degraded.

In Comparative Example 1, a non-sheet-like silicon-based material having an aspect ratio less than 1.5 is used as the first active substance, which leads to less tight bonding of the particles, poor compounding effect with the graphite, thus resulting in an increased specific surface area, and decreased first efficiency, and the electrolyte is immersed into the particles in the cycling process, and has side reaction with the internal material, thus continuously consuming the electrolyte and the active substance, and finally causing deterioration of the cycling performance.

In Comparative Example 2, the non-sheet-like graphite having an aspect ratio of less than 2 is used as a carrier, and the dispersibility of the silicon-based material obviously becomes poor, which leads to severe agglomeration of the silicon-based material, deteriorated internal conductivity, greatly reduced buffering effect of the graphite material, and finally increased material expansion and poor cycling life.

The applicant states that the detailed method of the present disclosure is illustrated through the above examples in the present disclosure, but the present disclosure is not limited to the above detailed method, that is, it does not mean that the present disclosure must be implemented relying upon the detailed method above.

What is claimed is:

1. A core-shell type composite negative electrode material, wherein the core-shell type composite negative electrode material comprises:
    an inner core which is formed of a first active substance and a second active substance, and
    a carbon coating outer shell acting as a third active substance,
    wherein the first active substance is a sheet-like silicon-based material, and the second active substance is a sheet-like graphite material; and
    wherein an aspect ratio of a particle of the sheet-like graphite material is larger than 2 and less than or equal to 120, wherein an aspect ratio of a particle of the sheet-like silicon-based material is larger than 15 and less than or equal to 100, the aspect ratio of the particle is a ratio of maximum linearity to minimum linearity of the particle, wherein the maximum linearity of a sheet-like material is a maximum length of a two-dimensional plane of the sheet-like material, and the minimum linearity is a thickness of the sheet-like material;
    wherein the first active substance is a mixture of Si and $SiO_x$ in a mass ratio of 0.01-100, wherein $0.5 \leq x \leq 1.5$, a median particle size of Si is 10-300 nm, a median particle size of $SiO_x$ is 150-5000 nm, and the median particle size of Si is smaller than the median particle size of $SiO_x$; or
    the first active substance is a mixture of Si and the Si-M alloy in a mass ratio of 0.01-100, wherein M is any one of B, Fe, Cu, Sn, Ge, Ti, Mg, Ni and Ce or a combination at least two thereof, a median particle size of Si is 10-300 nm, a median particle size of the Si-M alloy is 150-5000 nm, and the median particle size of Si is smaller than the median particle size of the Si-M alloy; or
    the first active substance is a mixture of $SiO_x$ and the Si-M alloy in a mass ratio of 0.01-100, wherein $0.5 \leq x \leq 1.5$, M is any one of B, Fe, Cu, Sn, Ge, Ti, Mg, Ni and Ce or a combination at least two thereof, a median particle size of $SiO_x$ is 150-400 nm, a median particle size of the Si-M alloy is 200-5000 nm, and the median particle size of $SiO_x$ is smaller than the median particle size of the Si-M alloy; or
    the first active substance is a mixture of $SiO_x$ and the Si-M alloy in a mass ratio of 0.01-100, wherein $0.5 \leq x \leq 1.5$, M is any one of B, Fe, Cu, Sn, Ge, Ti, Mg, Ni and Ce or a combination at least two thereof, a median particle size of the Si-M alloy is 150~400 nm, a median particle size of $SiO_x$ is 200-5000 nm, and the median particle size of the Si-M alloy is smaller than the medium particle size of $SiO_x$.

2. The core-shell type composite negative electrode material according to claim 1, wherein the carbon coating is converted from an organic carbon source by sintering.

3. The core-shell type composite negative electrode material according to claim 2, wherein the carbon coating has a thickness of 0.05-3 μm.

4. The core-shell type composite negative electrode material according to claim 1, wherein the second active substance comprises a component which is any one of natural graphite and artificial graphite or a combination of two therefrom.

5. The core-shell type composite negative electrode material according to claim 4, wherein a median particle size of the second active substance is 1-15 μm; or
    the median particle size of the second active substance is greater than a median particle size of the first active substance, with difference of 2 μm-12 μm.

6. The core-shell type composite negative electrode material according to claim 1, wherein based on a total mass of the core-shell type composite negative electrode material being 100 wt %, a mass percentage content of the first active substance is 1~70 wt %, a mass percentage content of the second active substance is 5~60 wt %, and a mass percentage content of the third active substance is 5~50 wt %.

7. The core-shell type composite negative electrode material according to claim 1, wherein the aspect ratio of the sheet-like graphite material is 3-50.

8. The core-shell type composite negative electrode material according to claim 1, wherein in the first active substance, an absolute value of difference in median particle sizes between the at least two of $SiO_x$ and Si-M alloy is 50 nm-1500 nm.

9. A negative electrode, wherein the negative electrode contains the core-shell type composite negative electrode material according to claim 1.

10. A lithium ion battery, wherein the lithium ion battery contains the core-shell type composite negative electrode material according to claim 1.

11. A core-shell type composite negative electrode material, wherein the core-shell type composite negative electrode material comprises:
   an inner core which is formed of a first active substance and a second active substance, and
   a carbon coating outer shell acting as a third active substance,
   wherein the first active substance is a sheet-like silicon-based material, and the second active substance is a sheet-like graphite material; and
   wherein an aspect ratio of a particle of the sheet-like graphite material is larger than 2 and less than or equal to 120, wherein an aspect ratio of a particle of the sheet-like silicon-based material is larger than 15 and less than or equal to 100, the aspect ratio of the particle is a ratio of maximum linearity to minimum linearity of the particle, wherein the maximum linearity of a sheet-like material is a maximum length of a two-dimensional plane of the sheet-like material, and the minimum linearity is a thickness of the sheet-like material;
   wherein the first active substance is a mixture of Si, SiOx and the Si-M alloy, wherein $0.5 \leq x \leq 1.5$, M is any one of B, Fe, Cu, Sn, Ge, Ti, Mg, Ni and Ce or a combination at least two thereof, a mass ratio of Si to SiOx is 0.02-100, a mass ratio of Si to the Si-M alloy is 0.02-100, a median particle size of Si is 10-300 nm, a median particle size of SiOx is 150-5000 nm, a median particle size of the Si-M alloy is 150-5000 nm, and the median particle size of Si<the median particle size of SiOx<the median particle size of the Si-M alloy; or
   the first active substance is a mixture of Si, SiOx and the Si-M alloy, a mass ratio of Si to SiOx is 0.02-100, wherein $0.5 \leq x \leq 1.5$, M is any one of B, Fe, Cu, Sn, Ge, Ti, Mg, Ni and Ce or a combination at least two thereof, a mass ratio of Si to the Si-M alloy is 0.02-100, a median particle size of Si is 10-300 nm, a median particle size of the SiOx is 150-5000 nm, a median particle size of the Si-M alloy is 150-5000 nm, and the median particle size of Si<the median particle size of the Si-M alloy<the median particle size of SiOx.

12. A method for preparing the core-shell type composite negative electrode material according to claim 1, wherein the method comprises steps of:
   (1) mixing and granulating the first active substance and the second active substance to obtain a first precursor; and
   (2) performing carbon coating modification on the first precursor, and then sintering a modified first precursor to obtain the core-shell type composite negative electrode material,
   wherein the first active substance is a sheet-like silicon-based material, and the second active substance is a sheet-like graphite material.

13. The method according to claim 12, wherein an aspect ratio of a particle of the sheet-like silicon-based material is 1.5~100, excluding 1.5, and the aspect ratio of the particle is a ratio of maximum linearity to minimum linearity of the particle.

14. The method according to claim 12, wherein a specific surface area of the sheet-like silicon-based material is 50~500 m²/g.

15. The method according to claim 12, wherein the method for the mixing and granulating in step (1) is any one of spray drying, mixing heating and kneading molding; or
   the method for the carbon coating modification in step (2) is any one of a liquid phase coating method, a solid phase coating method and a gas phase coating method; or
   the sintering in step (3) comprises: placing the second precursor into a reactor, heating to 500° C.-1200° C. under a condition of introducing an inert gas for protection, so as to obtain the core-shell type composite negative electrode material.

* * * * *